(12) United States Patent
Takahashi (10) Patent No.: US 11,571,810 B2
(45) Date of Patent: Feb. 7, 2023

(54) ARITHMETIC DEVICE, CONTROL PROGRAM, MACHINE LEARNER, GRASPING APPARATUS, AND CONTROL METHOD

(71) Applicant: Toyota Jidosha Kabushiki Kaisha, Toyota (JP)

(72) Inventor: Taro Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 397 days.

(21) Appl. No.: 16/875,452

(22) Filed: May 15, 2020

(65) Prior Publication Data
US 2020/0368901 A1 Nov. 26, 2020

(30) Foreign Application Priority Data
May 23, 2019 (JP) .............................. JP2019-096927

(51) Int. Cl.
*B25J 9/16* (2006.01)
*G06N 20/00* (2019.01)
*B25J 13/08* (2006.01)
*G06N 3/08* (2023.01)

(52) U.S. Cl.
CPC .............. *B25J 9/1612* (2013.01); *B25J 9/163* (2013.01); *B25J 13/085* (2013.01); *B25J 13/089* (2013.01); *G06N 3/08* (2013.01); *G06N 20/00* (2019.01)

(58) Field of Classification Search
CPC ........ B25J 9/1612; B25J 9/163; B25J 9/1602; B25J 9/1633; B25J 9/1679; B25J 9/1694; G06N 3/08; G06N 20/00
See application file for complete search history.

(56) References Cited

U.S. PATENT DOCUMENTS

| | | | |
|---|---|---|---|
| 2011/0132065 A1* | 6/2011 | Uebel | B25J 9/1692 73/1.79 |
| 2013/0030570 A1* | 1/2013 | Shimizu | G05D 1/0274 901/1 |
| 2017/0028553 A1* | 2/2017 | Tsuda | B25J 9/0084 |

(Continued)

FOREIGN PATENT DOCUMENTS

| | | |
|---|---|---|
| JP | H02-286298 A | 11/1990 |
| JP | 2005-319351 A | 11/2005 |

(Continued)

*Primary Examiner* — Ryan Rink
(74) *Attorney, Agent, or Firm* — Dinsmore & Shohl LLP (57) ABSTRACT

The arithmetic device configured to perform a calculation for controlling a motion of a grasping apparatus that performs work involving a motion of sliding a grasped object includes: an acquisition unit configured to acquire a state variable indicating a state of the grasping apparatus during the work; a storage unit storing a learned neural network that has been learned by receiving a plurality of training data sets composed of a combination of the state variable acquired in advance and correct answer data corresponding to the state variable; an arithmetic unit configured to calculate a target value of each of various actuators related to the work of the grasping apparatus by inputting the state variable to the learned neural network read from the storage unit; and an output unit configured to output the target value of each of the various actuators to the grasping apparatus.

8 Claims, 7 Drawing Sheets

(56) References Cited

U.S. PATENT DOCUMENTS

| | | | |
|---|---|---|---|
| 2018/0225113 A1* | 8/2018 | Hasegawa | B25J 9/161 |
| 2018/0330200 A1* | 11/2018 | Shibata | G06N 3/04 |
| 2019/0061151 A1* | 2/2019 | Namiki | B65G 57/00 |
| 2019/0143440 A1* | 5/2019 | Akita | B23K 9/328 |
| | | | 134/198 |
| 2019/0217467 A1* | 7/2019 | Passot | G06N 3/08 |
| 2019/0291271 A1* | 9/2019 | Hayashi | B25J 9/161 |
| 2019/0291277 A1* | 9/2019 | Oleynik | B25J 9/1697 |
| 2020/0094406 A1* | 3/2020 | Kusano | G06N 99/00 |
| 2021/0031358 A1* | 2/2021 | Sakaino | B25J 9/1697 |
| 2022/0032468 A1* | 2/2022 | Tellex | B25J 11/0075 |

FOREIGN PATENT DOCUMENTS

| | | |
|---|---|---|
| JP | 2010-089010 A | 4/2010 |
| JP | 2017-087316 A | 5/2017 |
| JP | 2017-121649 A | 7/2017 |
| JP | 2018-190241 A | 11/2018 |

\* cited by examiner

ARITHMETIC DEVICE, CONTROL PROGRAM, MACHINE LEARNER, GRASPING APPARATUS, AND CONTROL METHOD

CROSS REFERENCE TO RELATED APPLICATIONS

This application is based upon and claims the benefit of priority from Japanese patent application No. 2019-096927, filed on May 23, 2019, the disclosure of which is incorporated herein in its entirety by reference.

BACKGROUND

The present disclosure relates to an arithmetic device that performs a calculation for controlling a motion of a grasping apparatus that performs work involving a motion in which a grasping part or a grasped object grasped by the grasping part is brought into contact with a target object to slide the grasped object.

Robots that perform a desired motion by teaching them the motion of a manipulator are known. For example, Japanese Unexamined Patent Application Publication No. 2017-121649 discloses a robot that performs a welding operation by teaching it the motion of a manipulator.

SUMMARY

In recent years, efforts have been made to cause a robot as a grasping apparatus to perform work involving a motion in which a robot hand as a grasping part or a grasped object grasped by the robot hand is brought into contact with a target object to slide the grasped object, such as work of drawing a character or a figure and work of wiping. However, in some cases, work involving such a motion of sliding a grasped object is not accurately performed when the target object is changed, even if the robot is driven in accordance with an operation program prepared in advance. When the accuracy of work is increased by using a combination of feedback control and an operation program prepared in advance in order to address the above issue, the amount of calculation increases. This causes a problem that working time increases.

The present disclosure has been made in view of the above circumstances and an object thereof is to provide an arithmetic device capable of causing a grasping apparatus to perform, with high accuracy and in a short time, work involving a motion in which a grasping part or a grasped object grasped by the grasping part is brought into contact with a target object to slide the grasped object.

A first exemplary aspect is an arithmetic device configured to perform a calculation for controlling a motion of a grasping apparatus configured to perform work involving a motion in which a grasping part or a grasped object grasped by the grasping part is brought into contact with a target object to slide the grasped object, the arithmetic device including: an acquisition unit configured to acquire, as a state variable indicating a state of the grasping apparatus when the grasping apparatus is performing the work, any one of: a position and a speed of the target object; a type, a shape, and a state of the target object; a relative position and a relative speed of the grasping part or the grasped object with respect to the target object; a presence or absence of contact between the grasping part or the grasped object and the target object; an operating force of the grasping part or an operating force of each joint part related to a grasping of the grasped object; a vibration of a contact part between the grasping part or the grasped object and the target object; a sliding sound emitted from the contact part between the grasping part or the grasped object and the target object; and a difference between a target posture and an actual posture or an adaptive amount of a control system; a storage unit storing a learned machine learner that has been learned by receiving a plurality of training data sets composed of a combination of the state variable acquired in advance and correct answer data corresponding to the state variable; an arithmetic unit configured to calculate a target value of each of various actuators related to the work in the grasping apparatus by inputting the state variable to the learned machine learner read from the storage unit; and an output unit configured to output the target value of each of the various actuators to the grasping apparatus.

According to such a configuration, a learned machine learner can control a target value of each of various actuators in real time so that the target value is optimized in accordance with a work environment. Thus, it is possible to cause the grasping apparatus to accurately perform work involving a motion of sliding a grasped object with ease and in a short time.

Further, when a method for machine learning in the machine learner is supervised learning, the correct answer data in the training data sets includes an output obtained by calculating the target value of each of the various actuators and an output value of at least one of an image sensor, a rotation sensor, a force sensor, a vibration sensor, and an audio microphone. By doing so, it is possible to perform work with high accuracy and in a short time.

Further, the work may be work of drawing a predetermined character or a figure on the target object with a writing material as the grasped object.

Further, the work may be work of wiping the target object with a wiping tool as the grasped object.

Another exemplary aspect is a control program for controlling a motion of a grasping apparatus configured to perform work involving a motion in which a grasping part or a grasped object grasped by the grasping part is brought into contact with a target object to slide the grasped object, the control program causing a computer to: acquire, as a state variable indicating a state of the grasping apparatus when the grasping apparatus is performing the work, any one of: a position and a speed of the target object; a type, a shape, and a state of the target object; a relative position and a relative speed of the grasping part or the grasped object with respect to the target object; a presence or absence of contact between the grasping part or the grasped object and the target object; an operating force of the grasping part or an operating force of each joint part related to a grasping of the grasped object; a vibration of a contact part between the grasping part or the grasped object and the target object; a sliding sound emitted from the contact part between the grasping part or the grasped object and the target object; and a difference between a target posture and an actual posture or an adaptive amount of a control system; calculate a target value of each of various actuators related to the work in the grasping apparatus by inputting the state variable to the learned machine learner read from a storage unit storing a learned machine learner that has been learned by receiving a plurality of training data sets composed of a combination of the state variable acquired in advance and correct answer data corresponding to the state variable; and output the target value of each of the various actuators to the grasping apparatus. This configuration makes it possible to cause the grasping apparatus to perform, with high accuracy and in a short time, work involving a motion in which a grasping part or a grasped object grasped by the grasping part is brought into contact with a target object to slide the grasped object.

Another exemplary aspect is a machine learner configured to determine a target value of each of various actuators of a grasping apparatus configured to perform work involving a motion in which a grasping part or a grasped object grasped by the grasping part is brought into contact with a target object to slide the grasped object, in which the machine learner: uses, as a state variable that is acquired in advance and indicates a state of the grasping apparatus when the grasping apparatus is performing the work, any one of: a position and a speed of the target object; a type, a shape, and a state of the target object; a relative position and a relative speed of the grasping part or the grasped object with respect to the target object; a presence or absence of contact between the grasping part or the grasped object and the target object; an operating force of the grasping part or an operating force of each joint part related to a grasping of the grasped object; a vibration of a contact part between the grasping part or the grasped object and the target object; a sliding sound emitted from the contact part between the grasping part or the grasped object and the target object; and a difference between a target posture and an actual posture or an adaptive amount of a control system; and performs learning by receiving a plurality of training data sets composed of a combination of the state variable and a target value of each of the various actuators of the grasping apparatus in the motion of sliding the grasped object which is correct answer data corresponding to the state variable. This configuration makes it possible to cause the grasping apparatus to perform, with high accuracy and in a short time, work involving a motion in which a grasping part or a grasped object grasped by the grasping part is brought into contact with a target object to slide the grasped object.

Another exemplary aspect is a grasping apparatus including: a grasping part; various actuators related to work involving a motion in which the grasping part or a grasped object grasped by the grasping part is brought into contact with a target object to slide the grasped object; an acquisition unit configured to acquire, as a state variable indicating a state of the grasping apparatus when the grasping apparatus is performing the work, any one of: a position and a speed of the target object; a type, a shape, and a state of the target object; a relative position and a relative speed of the grasping part or the grasped object with respect to the target object; a presence or absence of contact between the grasping part or the grasped object and the target object; an operating force of the grasping part or an operating force of each joint part related to a grasping of the grasped object; a vibration of a contact part between the grasping part or the grasped object and the target object; a sliding sound emitted from the contact part between the grasping part or the grasped object and the target object; and a difference between a target posture and an actual posture or an adaptive amount of a control system; a storage unit storing a learned machine learner that has been learned by receiving a plurality of training data sets composed of a combination of the state variable acquired in advance and correct answer data corresponding to the state variable; an arithmetic unit configured to calculate a target value of each of the various actuators by inputting the state variable to the learned machine learner read from the storage unit; and an output unit configured to output the target value of each of the various actuators to the grasping apparatus. This configuration makes it possible to perform, with high accuracy and in a short time, work involving a motion in which a grasping part or a grasped object grasped by the grasping part is brought into contact with a target object to slide the grasped object.

According to the present disclosure, it is possible to cause a grasping apparatus to perform, with high accuracy and in a short time, work involving a motion in which a grasping part or a grasped object grasped by the grasping part is brought into contact with a target object to slide the grasped object.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, although the present disclosure will be described with reference to an embodiment of the present disclosure, the present disclosure according to claims is not limited to the following embodiment. Moreover, all the components described in the following embodiment are not necessarily indispensable for means for solving problems. For the clarification of the description, the following description and the drawings may be omitted or simplified as appropriate. Throughout the drawings, the same components are denoted by the same reference signs and repeated descriptions will be omitted as appropriate.

An arithmetic device according to the present disclosure performs a calculation for controlling a motion of a robot as a grasping apparatus that performs work involving a motion in which a grasping part or a grasped object grasped by the grasping part is brought into contact with a target object to slide the grasped object (hereinafter simply referred to as "work that involves sliding"). It should be noted that work that involves sliding is, for example, work of drawing a predetermined character or a figure on a target object with a writing material as a grasped object or work of wiping a target object with a wiping tool as a grasped object.

First, the configuration of a robot as a grasping apparatus to which the arithmetic device according to this embodiment is applied is described.

Figure 1:
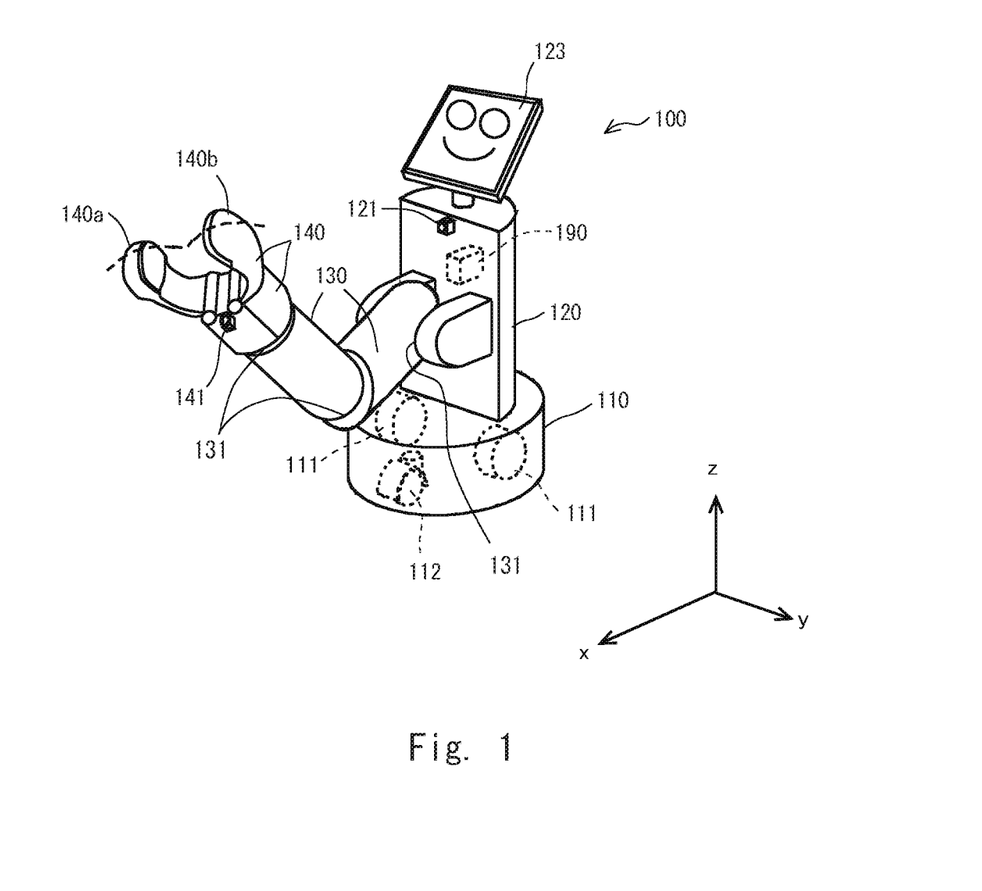
FIG. 1 is an external perspective view of a robot to which an arithmetic device according to an embodiment is applied.

FIG. 1 is an external perspective view of a robot 100 to which the arithmetic device according to this embodiment is applied. In FIG. 1, an xy plane is a traveling surface of the robot 100, and a z-axis positive direction indicates a zenith direction. As shown in FIG. 1, the robot 100 mainly includes a movable base part 110 as a moving mechanism for moving on a traveling surface, a main-body part 120, a robot arm 130, and a robot hand 140 as a grasping part, the robot arm 130 and the robot hand 140 constituting a grasping mechanism.

The movable base part 110 supports two driving wheels 111 and a caster 112, each of which is in contact with the traveling surface, inside its cylindrical housing. The two driving wheels 111 are arranged so that the centers of their rotation axes coincide with each other. Each of the driving wheels 111 is rotationally driven by a motor (not shown) independently of each other. The caster 112 is a driven wheel and is disposed so that its pivotal axis extending from the movable base part 110 in the vertical direction axially supports the wheel at a place away from its rotation axis. Further, the caster 112 follows the movement of the movable base part 110 so as to move in the moving direction of the movable base part 110. The robot 100 goes straight forward when, for example, the two driving wheels 111 are rotated at the same rotational speed in the same direction, and turns around the vertical axis that passes the center of the two driving wheels 111 of the movable base part 110 when, for example, they are rotated at the same rotational speed in the opposite directions.

The main-body part 120 supports the robot arm 130 and includes a display panel 123 which forms a part of a user interface. The display panel 123 is, for example, a liquid-crystal panel, and displays a face of a character and shows information about the robot 100. The display panel 123 includes a touch panel on a display surface thereof, and can receive an instruction input from a user.

The main-body part 120 includes an environmental camera 121 provided at a position where an environmental space including moving ranges of the robot arm 130 and the robot hand 140 can be observed. The environmental camera 121 include an image pickup device which is, for example, an image sensor and an image data generating unit, and outputs image data generated by shooting an environmental space in front of it. Further, a control box 190 is provided in the main-body part 120. The control box 190 includes a control unit, a memory and the like that will be described later.

The robot arm 130 supported by the main-body part 120 includes a plurality of links, for example, two links as shown in FIG. 1, and may take various postures by driving an actuator provided in a joint part 131 (a wrist joint, an elbow joint, a shoulder joint, etc.) for rotatably coupling each link. A speed reduction mechanism is provided in each joint part 131. A hand camera 141 is arranged at the tip of the robot arm 130. The hand camera 141 includes an image pickup device which is, for example, an image sensor and an image data generating unit, and outputs image data generated by shooting a space in front of the robot hand 140. Further, the robot hand 140 is connected to the tip of the robot arm 130, and the whole robot hand 140 can be rotated by driving an actuator around the pivotal axis parallel to the direction in which a tip link of the robot arm 130 is extended. The robot hand 140 includes a first finger 140*a* and a second finger 140*b* which are driven by an actuator provided at its tip. The first and second fingers 140*a* and 140*b* can grasp by moving so as to approach each other as indicated by dotted lines and grasping a target object.

Note that the robot 100 may not include the movable base part 110 as a moving mechanism, and it is sufficient that the robot 100 include at least the robot arm 130 and the robot hand 140 that constitute a grasping mechanism.

Figure 2:
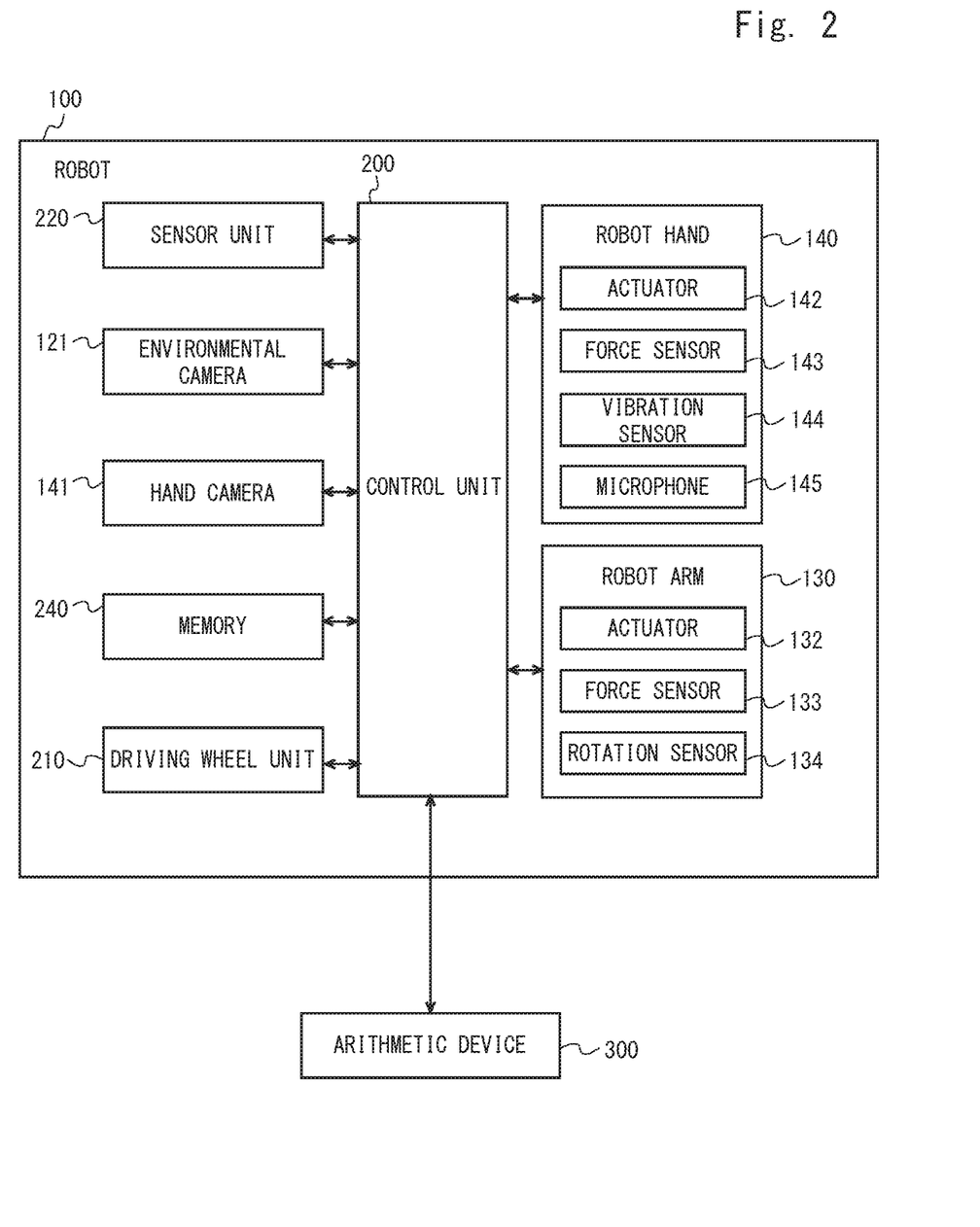
FIG. 2 is a block diagram showing a control configuration of the robot.

FIG. 2 is a block diagram showing a control configuration of the robot 100. The control unit 200 is, for example, a CPU, and is housed in the control box 190 (see FIG. 1) of the main-body part 120. A driving wheel unit 210 includes a drive circuit and a motor for driving the driving wheels 111 (see FIG. 1), and is provided in the movable base part 110 (see FIG. 1).

A sensor unit 220 includes various sensors for detecting obstacles while moving and contact from outside, and is disposed in the movable base part 110 and the main-body part 120 (see FIG. 1) in a distributed manner. The control unit 200, by sending a control signal to the sensor unit 220, drives various sensors and acquires outputs from them.

As described above, the environmental camera 121 is used for observing the environmental space in front of it including the moving ranges of the robot arm 130 and the robot hand 140, and performs shooting in accordance with a shooting instruction from the control unit 200. The environmental camera 121 passes the generated image data to the control unit 200. As described above, the hand camera 141 is used for observing the space in front of the robot hand 140, and performs shooting in accordance with a shooting instruction from the control unit 200. The hand camera 141 passes the generated image data to the control unit 200.

A memory 240 is a nonvolatile storage medium, and for example, a solid state drive is used. The memory 240 stores, in addition to a control program for controlling the robot 100, various parameter values, functions, lookup tables and the like which are used for the control.

The robot arm 130 includes an actuator 132 for driving each joint part 131, a rotation sensor 134 for detecting rotation information on each joint part 131, and a force sensor 133 for detecting an operation force (torque) of each joint part 131 in addition to the structure described with reference to FIG. 1. The actuator 132 is, for example, a servo motor. The rotation sensor 134 is, for example, an encoder. The force sensor 133 is, for example, a torque sensor or the like for detecting torque of each joint part 131.

The robot hand 140 includes an actuator 142 for driving the first finger 140*a* and the second finger 140*b* (see FIG. 1), a force sensor 143 for detecting an operation force of the robot hand 140, a vibration sensor 144, and a microphone 145 as an audio microphone. The vibration sensor 144 is a vibration sensor for vibrating the contact part between the robot hand or the grasped object and the target object, such as an acceleration pickup. The microphone 145 is a microphone for detecting a sliding sound emitted from the contact part between the robot hand or the grasped object and the target object.

The control unit 200 performs rotation control of the driving wheels 111 by sending a driving signal to the driving wheel unit 210. Further, the control unit 200 controls motions of the robot arm 130 and the robot hand 140 based on a result of calculation performed by an arithmetic device 300 according to this embodiment. That is, the control unit 200 transmits a driving signal to the actuator 132 of the robot arm 130 and the actuator 142 of the robot hand 140 based on a result of calculation performed by the arithmetic device 300 according to this embodiment.

Next, the configuration of the arithmetic device 300 according to this embodiment is described.

Figure 3:
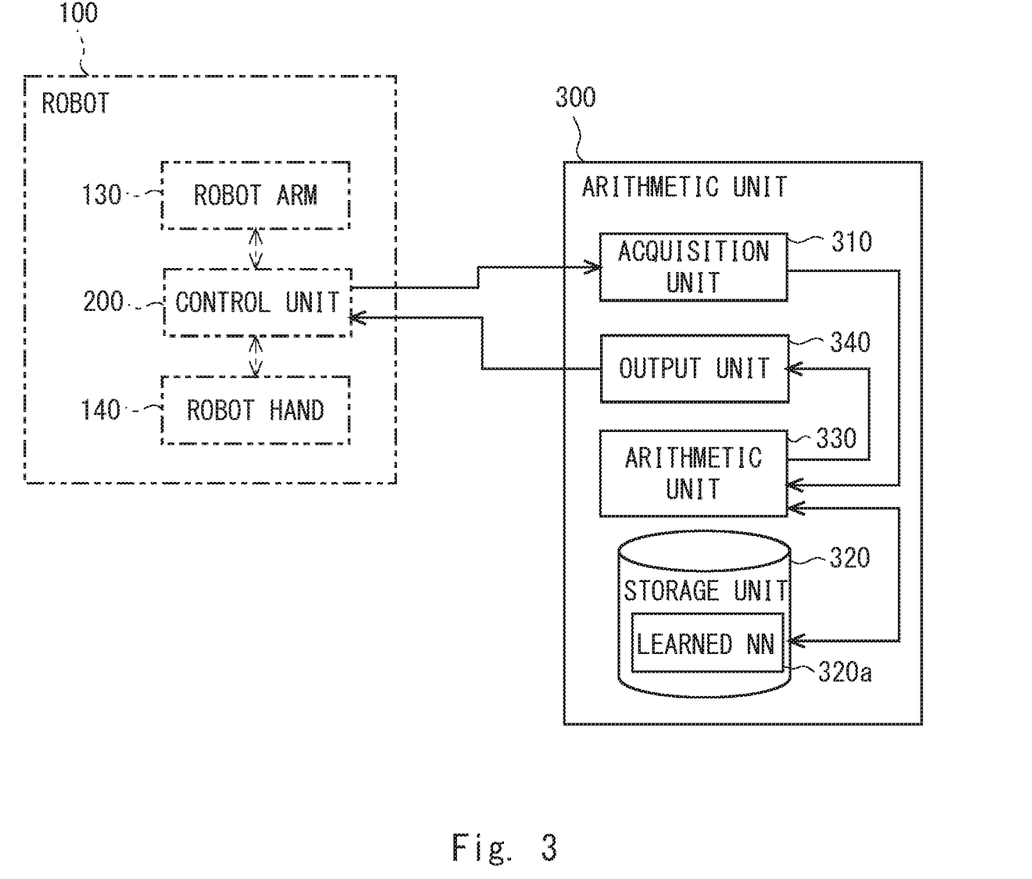
FIG. 3 is a block diagram showing a configuration of the arithmetic device.

FIG. 3 is a block diagram showing the configuration of the arithmetic device 300. As shown in FIG. 3, the arithmetic device 300 mainly includes an acquisition unit 310, a storage unit 320, an arithmetic unit 330, and an output unit 340.

The acquisition unit 310 acquires a state variable indicating the state of the robot 100 when the robot 100 is performing work that involves sliding, and passes the state variable to the arithmetic unit 330. The acquisition unit 310 includes a communication interface for connecting to the Internet. The communication interface is, for example, a wireless LAN unit.

It should be noted that a state variable to be acquired is any one of:
1) a position and a speed of the target object;
2) a type, a shape, and a state of the target object;
3) a relative position and a relative speed of the robot hand 140 or the grasped object with respect to the target object;
4) a presence or absence of contact between the robot hand 140 or the grasped object and the target object;
5) an operating force of the robot hand 140 or an operating force of each joint part 131 related to a grasping of the grasped object;
6) a vibration of a contact part between the robot hand 140 or the grasped object and the target object;
7) a sliding sound emitted from the contact part between the robot hand 140 or the grasped object and the target object; and
8) a difference between a target posture and an actual posture or an adaptive amount of a control system. For the state variable to be acquired, 1) to 7) may be used in combination as appropriate.

Among the aforementioned state variables, 1) and 2) are acquired by the hand camera 141, 3) and 8) are acquired by the rotation sensor 134 of the robot arm 130, 4) is acquired by the force sensor 143 of the robot hand 140, and 5) is acquired by the force sensor 133 of the robot arm 130 (see FIG. 2). Further, 6) is acquired by the vibration sensor 144, and 7) is acquired by the microphone 145 (see FIG. 2).

Note that when a vibration of the contact part between the robot hand or the grasped object and the target object is selected as a state variable, it is possible to more accurately recognize the sliding between the robot hand or the grasped object grasped by the robot hand and the target object. Further, when a sliding sound emitted from the contact part between the robot hand or the grasped object and the target object is selected as a state variable, it is possible to more accurately recognize the sliding between the robot hand or the grasped object grasped by the robot hand and the target object.

The storage unit 320 is, for example, a hard disk drive, and stores a learned neural network (hereinafter referred to as a "learned NN 320a" or the like) as a learned machine learner. The learned NN 320a performs learning by receiving a plurality of training data sets composed of a combination of the state variable acquired in advance and correct answer data corresponding to the state variable. A specific method for causing a neural network to learn as a machine learner in the learned NN 320a will be described later. The storage unit 320 stores various software programs executed by the arithmetic unit 330 in addition to the learned NN 320a.

The arithmetic unit 330 is, for example, a CPU, and calculates target values of various actuators related to work that involves sliding performed by the robot 100 by inputting the state variable to the learned NN 320a read from the arithmetic unit 330. It should be noted that the various actuators related to work that involves sliding are the actuator 132 of the robot arm 130 and the actuator 142 of the robot hand 140.

Upon receiving the state variable from the acquisition unit 310, the arithmetic unit 330 reads the learned NN 320a from the storage unit 320. The arithmetic unit 330 inputs the state variable to the learned NN 320a, calculates target values of the various actuators related to work that involves sliding performed by the robot 100, and passes the calculated target values to the output unit 340.

The output unit 340 outputs the target values of the various actuators to the robot 100. The output unit 340 includes a communication interface for connecting to the Internet. The output unit 340 may share the communication interface of the acquisition unit 310.

Next, a specific method for causing a neural network to learn in the learned NN 320a is described. Note that in the following description, FIG. 2 is appropriately referred to for the control configuration of the robot 100, and FIG. 3 is appropriately referred to for the configuration of the arithmetic device 300.

Figure 4:
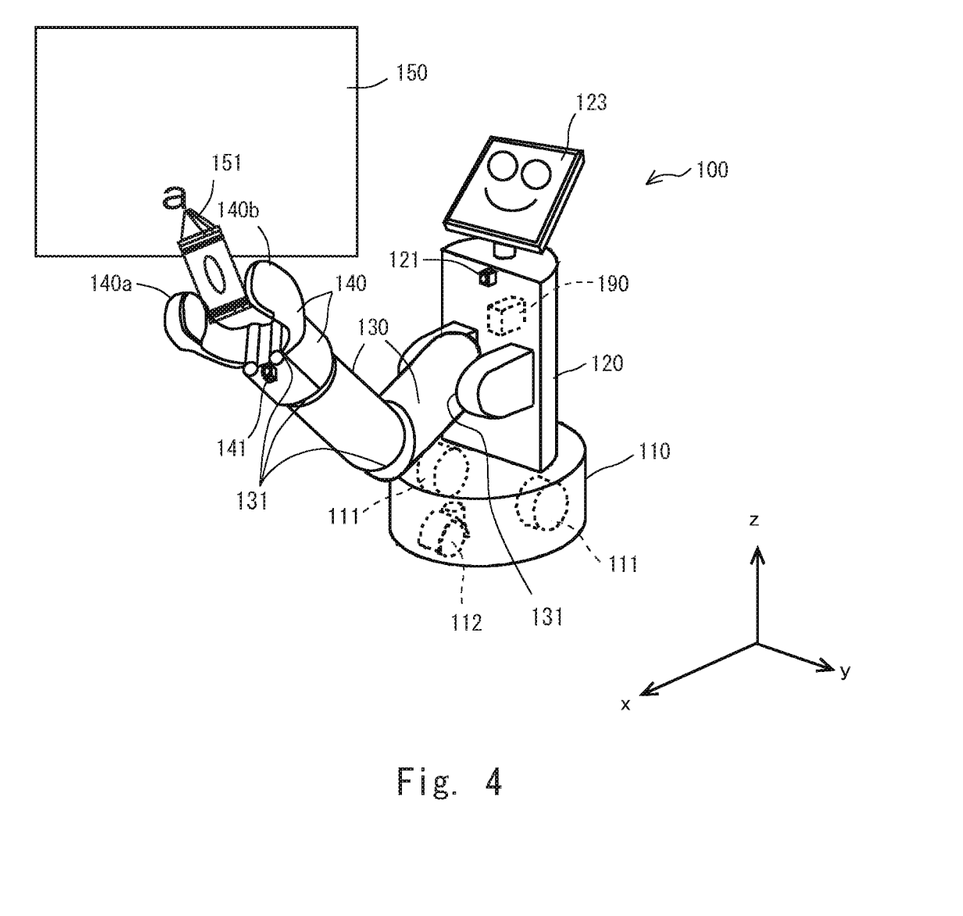
FIG. 4 is a schematic diagram showing a state in which the robot is caused to perform work that involves sliding (work of writing a character)

FIG. 4 is a schematic diagram showing a state in which the robot 100 is caused to perform work that involves sliding. As shown in FIG. 4, it is assumed that the work that involves sliding performed by the robot 100 is work of drawing a predetermined character or a figure on a target object 150 with a writing material 151 as a grasped object (hereinafter referred to as a "character-writing work"). In a character-writing work, the target object 150 is a medium for writing a character, such as a whiteboard, a blackboard, and imitation vellum. In FIG. 4, the robot 100 is performing work of writing the character "a" of the alphabet.

Figure 5:
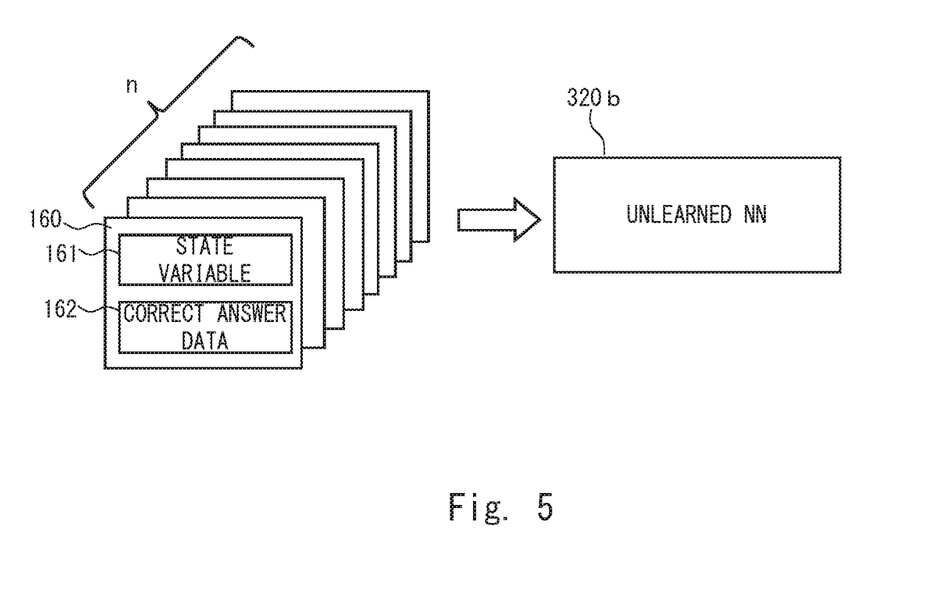
FIG. 5 is a schematic diagram specifically explaining a method for causing an unlearned NN to learn work of writing a character by supervised learning.

FIG. 5 is a schematic diagram specifically explaining a method for causing an unlearned NN 320b to learn a character-writing work by supervised learning. It is assumed here that a method for causing an unlearned neural network (hereinafter referred to as an "unlearned NN 320b" or the like) to learn a character-writing work is supervised learning. Supervised learning is a method in which a large number of training data sets composed of a combination of data (input) to be learned and its correct answer (output) are given in advance when the data to be learned has the predetermined correct answer so that a relation between the input and the output is learned.

As shown in FIG. 5, a training data set 160 composed of a combination of a state variable 161 as an input and a correct answer data 162 as an output is given to the unlearned NN 320b. It should be noted that the correct answer data (determination data) 162 includes the target value of each of various actuators related to a character-writing work in the robot 100 and an output value of at least one of an image sensor of the environmental camera 121, the rotation sensor 134, the force sensor 133, the vibration sensor 144, and the microphone 145. A plurality of training data sets 160 are acquired in advance, for example, by a person operating the robot 100 with a teaching pendant or the like and causing the robot 100 to repeat a motion of writing a character as shown in FIG. 4. By doing so, the unlearned NN 320b learns a relation between the state variable 161 and the correct answer data 162 in the character-writing work. Increasing an acquisition number n of the training data set 160 enables the determination accuracy of the learned NN 320a to be improved.

In learning of a character-writing work, the robot 100 is caused to repeat the character-writing work with respect to one character, so that the robot 100 acquires a plurality of training data sets 160. Then, the plurality of training data sets 160 for each character are given to the unlearned NN 320b, thereby causing the unlearned NN 320b to perform learning for each character. That is, when the unlearned NN 320b finishes learning of, for example, work of writing the alphabet character "a", the unlearned NN 320b is caused to similarly, sequentially perform learning of work of writing "b", work of writing "c", and so on.

Figure 6:
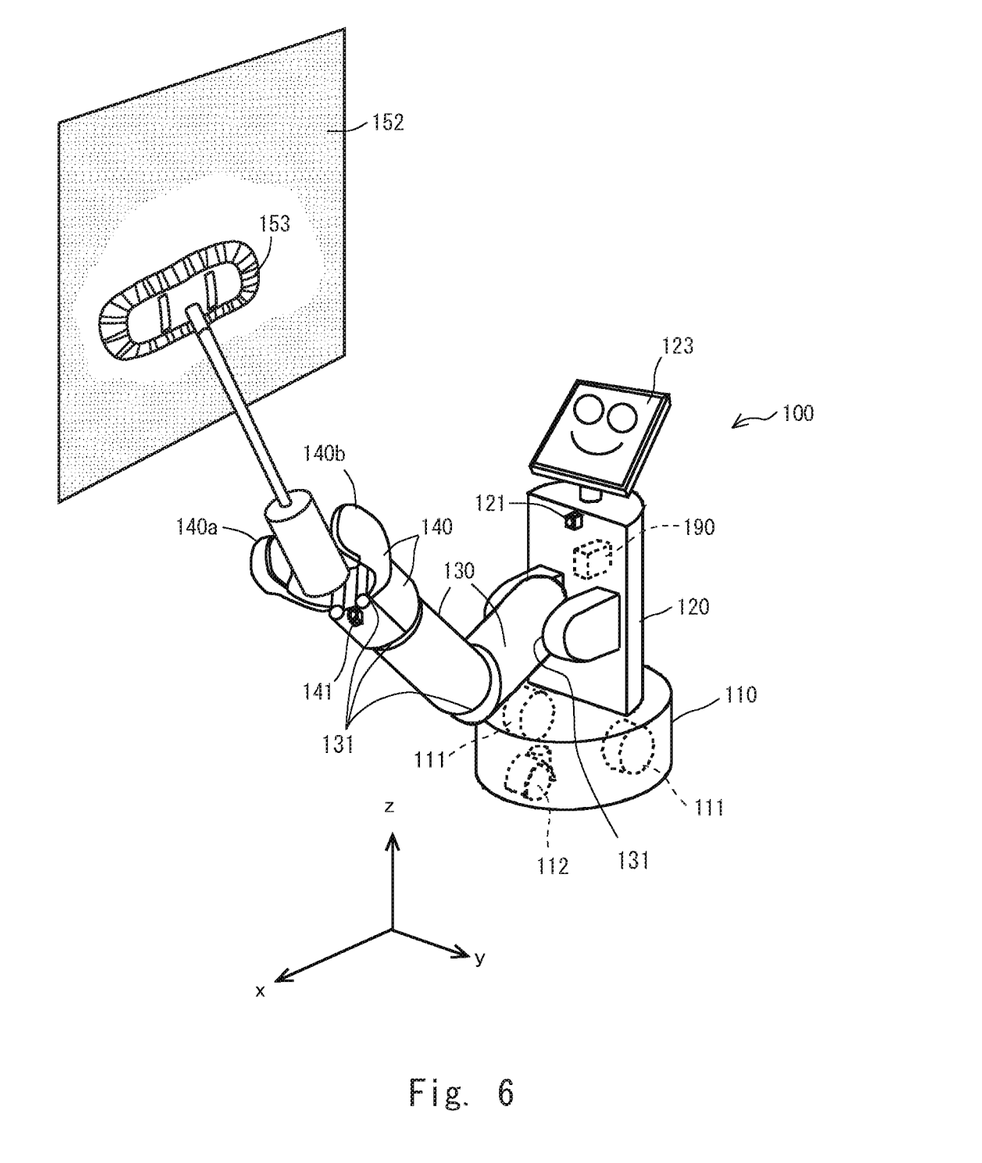
FIG. 6 is a schematic diagram showing a state in which the robot is caused to perform work of wiping.

A method for causing the unlearned NN 320b to learn work of wiping a target object with a wiping tool as a grasped object (hereinafter referred to as a "wiping work") is similar to that for the character-writing work described above. FIG. 6 is a schematic diagram showing a state in which the robot 100 is caused to perform a wiping work. As shown in FIG. 6, the robot 100 wipes a target object 152 with a wiping tool 153. In a wiping work, the target object 152 is an object from which it is required that dirt and dust be removed, such as that on a window and a desk, and the wiping tool 153 is a medium for wiping, such as a mop and a dustcloth.

In a case of a wiping work, the correct answer data 162 (see FIG. 5) includes the target value of each of various actuators related to the wiping work in the robot 100 and an output value of at least one of an image sensor of the environmental camera 121, the rotation sensor 134, the force sensor 133, the vibration sensor 144, and the microphone 145. A plurality of training data sets 160 are acquired in advance, for example, by a person operating the robot 100 with a teaching pendant or the like and causing the robot 100 to repeat a motion of wiping as shown in FIG. 6. By doing so, the unlearned NN 320b learns a relation between the state variable 161 and the correct answer data 162 in the wiping work.

Next, a flow of processing performed by the arithmetic device 300 is described.

Figure 7:
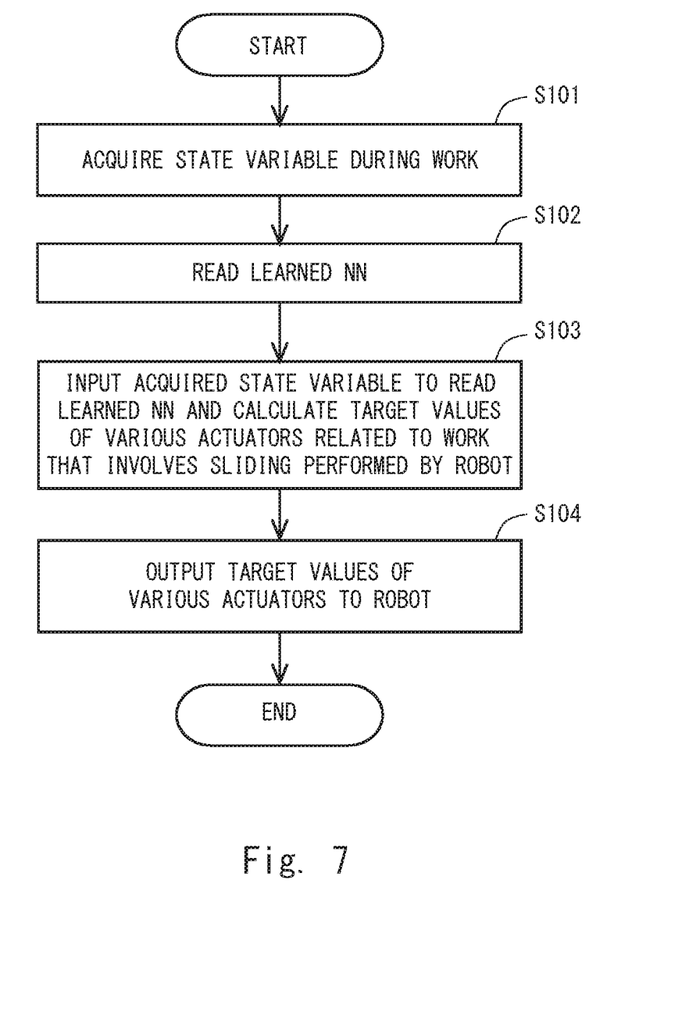
FIG. 7 is a flowchart showing a flow of processing performed by the arithmetic device.

FIG. 7 is a flowchart showing the flow of the processing performed by the arithmetic device 300. As shown in FIG. 7, first, the acquisition unit 310 acquires a state variable during work that involves sliding, and passes the state variable to the arithmetic unit 330 (Step S101).

Next, the arithmetic unit 330 reads the learned NN 320a from the storage unit 320 (Step S102). Then, the arithmetic unit 330 inputs the acquired state variable to the read learned NN 320a, calculates target values of the various actuators related to the work that involves sliding performed by the robot 100, and passes the calculated target values to the output unit 340 (Step S103). Next, the output unit 340 outputs the target values of the various actuators to the robot 100 (Step S104). Then, the series of processes is ended.

As described above, the arithmetic device 300 uses, as an input performed by a machine learner, a state variable that can be easily acquired and can be used to determine the quality of work that involves sliding, such as a sliding sound emitted from the contact part between the robot hand 140 or the grasped object and the target object. By using the target values of various actuators calculated by the above learned machine learner using a state variable as an input, it is possible to control the robot 100 in real time so that work that involves sliding performed by the robot 100 is optimized in accordance with the work environment. Accordingly, the robot 100 can accurately perform work that involves sliding with ease and in a short time.

Note that the present disclosure is not limited to the aforementioned embodiment, and can be appropriately changed without departing from the spirit of the disclosure. For example, in the aforementioned embodiment, the arithmetic device and the control unit of the robot are formed separate from each other, but the functional blocks (the acquisition unit, the arithmetic unit, the storage unit, and the output unit) of the arithmetic device may be incorporated into the control unit of the robot.

As a neural network used in the arithmetic device according to the aforementioned embodiment, a neural network that handles time-series data such as a recurrent neural network (RNN) and a sequence-to-sequence model can be used. Regarding a method for causing an unlearned NN to perform learning, causing an unlearned NN to learn work that involves sliding by supervised learning has been given as an example of such a method in the above-described embodiment. However, the method is not limited to this. The work that involves sliding may be performed by another method for machine learning such as reinforcement learning.

The components implemented by the arithmetic device in the aforementioned embodiment can also be implemented, for example, by causing a computer to execute a control program. More specifically, in a computer, the components can be implemented by loading a control program stored in a storage unit (not shown) in a main storage device (not shown) and executing the control program in the main storage device. Further, the components are not necessarily implemented by software as a program but may be implemented by a combination of any hardware, firmware and software or the like.

The above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be apparent that the embodiments of the disclosure may be varied in many ways. Such variations are not to be regarded as a departure from the spirit and scope of the disclosure, and all such modifications as would be apparent to one skilled in the art are intended for inclusion within the scope of the following claims.

What is claimed is:

1. An arithmetic system configured to perform a calculation for controlling a motion of a grasping system configured to perform work involving a motion in which a grasping part or a grasped object grasped by the grasping part is brought into contact with a target object to slide the grasped object, the arithmetic system including:
a central processing unit configured to:
acquire, as a state variable indicating a state of the grasping system when the grasping system is performing the work, the state variable including a sliding sound emitted from the contact part between the grasping part or the grasped object and the target object;
store a learned machine learner that has been trained by receiving a plurality of training data sets composed of a combination of the state variable acquired in advance and correct answer data corresponding to the state variable;
calculate a target value of each of various actuators related to the work in the grasping system by inputting the state variable to the learned machine learner; and output the target value of each of the various actuators to the grasping system.

2. The arithmetic system according to claim 1, wherein when a method for machine learning in the machine learner is supervised learning, the correct answer data in the training data sets includes an output obtained by calculating the target value of each of the various actuators and an output value of at least one of an image sensor, a rotation sensor, a force sensor, a vibration sensor, and an audio microphone.

3. The arithmetic system according to claim 1, wherein the work is work of drawing a predetermined character or a figure on the target object with a writing material as the grasped object.

4. The arithmetic system according to claim 1, wherein the work is work of wiping the target object with a wiping tool as the grasped object.

5. A non-transitory computer readable medium storing a control program for controlling a motion of a grasping system configured to perform work involving a motion in which a grasping part or a grasped object grasped by the grasping part is brought into contact with a target object to slide the grasped object, the control program causing a computer to:
acquire, as a state variable indicating a state of the grasping system when the grasping system is performing the work, the state variable includes a sliding sound emitted from the contact part between the grasping part or the grasped object and the target object;
calculate a target value of each of various actuators related to the work in the grasping system by inputting the state variable to a learned machine learner that has been trained by receiving a plurality of training data sets composed of a combination of the state variable acquired in advance and correct answer data corresponding to the state variable; and
output the target value of each of the various actuators to the grasping system.

6. A machine learner configured to determine a target value of each of various actuators of a grasping system configured to perform work involving a motion in which a grasping part or a grasped object grasped by the grasping part is brought into contact with a target object to slide the grasped object, wherein
the machine learner: uses, as a state variable that is acquired in advance and indicates a state of the grasping system when the grasping system is performing the work, the state variable includes a sliding sound emitted from the contact part between the grasping part or the grasped object and the target object; and performs learning by receiving a plurality of training data sets composed of a combination of the state variable and a target value of each of the various actuators of the grasping system in the motion of sliding the grasped object which is correct answer data corresponding to the state variable.

7. A grasping system comprising:
a grasping part;
various actuators related to work involving a motion in which the grasping part or a grasped object grasped by the grasping part is brought into contact with a target object to slide the grasped object; and
a central processing unit configured to:
acquire, as a state variable indicating a state of the grasping system when the grasping system is performing the work, the state variable includes a sliding sound emitted from the contact part between the grasping part or the grasped object and the target object;
store a learned machine learner that has been trained by receiving a plurality of training data sets composed of a combination of the state variable acquired in advance and correct answer data corresponding to the state variable;
calculate a target value of each of the various actuators by inputting the state variable to the learned machine learner; and
output the target value of each of the various actuators to the grasping system.

8. A control method for controlling a motion of a grasping system configured to perform work involving a motion in which a grasping part or a grasped object grasped by the grasping part is brought into contact with a target object to slide the grasped object, the control method comprising:
acquiring, as a state variable indicating a state of the grasping system when the grasping system is performing the work, the state variable includes a sliding sound emitted from the contact part between the grasping part or the grasped object and the target object; and
calculating a target value of each of various actuators related to the work in the grasping system by inputting the state variable to a learned machine learner that has been trained by receiving a plurality of training data sets composed of a combination of the state variable acquired in advance and correct answer data corresponding to the state variable.

* * * * *